United States Patent [19]

Trungold

[11] Patent Number: 4,773,272
[45] Date of Patent: Sep. 27, 1988

[54] APPARATUS AND METHOD FOR MEASURING BOLT TENSION IN SITU

[76] Inventor: Emanuel H. Trungold, 14B Broun Pl., Bronx, N.Y. 10475

[21] Appl. No.: 934,739

[22] Filed: Nov. 25, 1986

[51] Int. Cl.⁴ .................................. F16B 31/02
[52] U.S. Cl. .................................. 23/761; 411/10
[58] Field of Search ............... 73/761, 768, 775, 774, 73/862.02; 411/10, 8, 9, 11, 12, 14

[56] References Cited

U.S. PATENT DOCUMENTS

| | | | |
|---|---|---|---|
| 3,104,645 | 9/1963 | Harrison | 411/8 |
| 4,131,050 | 12/1978 | Holmes | 411/10 |
| 4,164,164 | 8/1979 | Trungold | 411/10 |
| 4,303,001 | 12/1981 | Trungold | 411/10 |
| 4,483,648 | 11/1984 | Trungold | 411/10 |

FOREIGN PATENT DOCUMENTS 658160  2/1963  Canada .................................. 73/761

OTHER PUBLICATIONS

Electronic Fastener Monitoring: Ensuring the Grip, Assembly Engineering, Apr. 1984, pp. 31–33.
Avoiding Failure in Bolted Joints, Machine Design, May 20, 1982, pp. 79–82.
Tools for Reliable Fastening, Assembly Engineering, Feb. 1982, pp. 26–31.
Fastener Tension Control—What It's All About, Assembly Engineering, Nov. 1976, pp. 22–30.
Data Management Technology of the Treaded Fastening Process, Fastener Technology, Aug. 1984, pp. 23–27.
PLI Washers, Preload Indicating, SPS Technologies Product Brochure.
Here's How to Use Load Indicator Washers, Bethlehem Steel Corporation Brochure.
The Load Indicator Bolt, Bethlehem Steel Corporation Product Brochure.
Guard–Nut Torque Limiter, Guard–Nut Product Brochure, May 1980.
RotaBolt Load Controlling Fasteners, Thomas Register 1985, Peterson Industries, Inc.

Primary Examiner—John Chapman
Assistant Examiner—Robert R. Raevis
Attorney, Agent, or Firm—Schechter, Brucker & Pavane

[57] ABSTRACT

An apparatus and method for measuring bolt tension in situ is disclosed. In one embodiment, a tab (12) is disposed in a radial groove (42) in a washer (10) with the proximal end (46) of the tab (12) secured in the groove (42). When the washer (10) is incorporated in a bolt assembly and the bolt (14) is tightened, the distal portion (48) of the tab (12) deflects. By measuring the force required to return the distal portion (48) of the tab (12) to its undeflected position, actual bolt tension can be determined. The tab may, instead, be incorporated in the bearing surface of a bolt head (306) or nut (406).

46 Claims, 6 Drawing Sheets

APPARATUS AND METHOD FOR MEASURING BOLT TENSION IN SITU

BACKGROUND OF THE INVENTION

1. Field of the Invention

This invention pertains to the measurement, in situ, of the tension in a high tensile strength bolt.

2. The Prior Art

In the many applications for high tensile strength bolts, the maintenance of proper bolt tension is a critical parameter. If there is insufficient bolt tension, then the joint secured by the bolt will not be as strong as desired. On the other hand, if the bolt is overstressed, a potential failure is built into the joint.

Following initial installation of a high tension bolt, bolt tension may decrease over a period of time due, for example, to vibration. In applications such as bridges, nuclear reactors, etc., it is important to maintain proper bolt tension throughout the life of the installation. Accordingly, it is common practice in such installations to periodically monitor bolt tension in situ. In one common practice, a torque wrench is secured to the bolt head and tightened to the point of impending motion. The reading on the torque wrench at the point of impending motion is taken as an indication of bolt tension. One problem with this approach is that because the torque reading is taken at the point of impending motion, the procedure may result in some slight additional tightening of the bolt. This can result in over-tightening and possible damage, especially when it is considered that this procedure may be performed on each bolt several times over the life of the installation. Another problem with this procedure is that it does not measure actual tension. Rather, it measures torque, and it is well known that forces other than tension contribute to the torque reading. An extreme example occurs when a bolt head is rusted in place. A high torque reading would be shown by the torque wrench, reflecting the torque required to overcome the rust bonding the bolt head to the joint. This high torque reading would then be interpreted as indicating a correspondingly high bolt tension when, in fact, the actual bolt tension might be much lower or non-existent.

Most of the available technology for monitoring bolt tension is concerned with preloading the bolt upon installation. For example, pulse-echo and standing wave measurement ultrasonic techniques are employed for measuring bolt length, which can be directly correlated to bolt tension. While such techniques can be employed to periodically monitor bolt tension following installation, it will be apparent that such techniques are expensive and not suited to most applications. Computer controlled torque systems are also in use for preloading bolts upon installation, but do not provide a simple and effective approach to monitoring bolt tension in situ following installation. These tools and their applications are discussed generally in Electronic Fastener Monitoring: Ensuring The Grip, Assembly Engineering, April, 1984, p. 31; Avoiding Failure In Bolted Joints, Machine Design, May 20, 1982, p. 79; Tools For Reliable Fastening, Assembly Engineering, February, 1982, p. 26; and Fastener Tension Control—What It's All About, Assembly Engineering, November, 1976, p. 22.

Various types of load indicating washers are also available. These washers deform upon installation to indicate proper preload. However, they do not incorporate a mechanism for indicating actual bolt tension following installation. Reference is made, for example, to preload indicating washers marketed by SPS Technologies, Jenkintown, Pa. which employ an arrangement consisting of two concentric steel rings sandwiched between two close tolerance washers. This arrangement relies upon elastic deformation of one sandwiched washer to bind the other sandwiched washer against rotation thereby indicating that the desired preload has been achieved. Another exemplary preload indicating washer is marketed by J&M Turner, Inc., Bristol, Pa. under the designation DTI. That washer includes a plurality of axially extending humps. Compression of the humps upon tightening indicates that the proper preload has been achieved. These washers also do not provide any means for monitoring bolt tension following installation. In addition, because of the intervening humps, the washer does not present a full bearing surface to the bolt head. Not all jurisdictions allow their use, and they are easily tampered with by flattening the humps, as with a hammer, prior to use.

In my issued U.S. Pat. No. 4,303,001, in one embodiment disclosed in FIGS. 8-9, I disclose a washer including a radial slot or groove having a strip of resilient material disposed therein. One end of the strip seats under the bolt head and is subjected to compression as the bolt head is tightened. The spring force is selected such that the other end of the strip deflects upward when the proper bolt tension has been reached. It is also pointed out in the patent that if the bolt loosens, the strip will return to its flat position in the groove, thereby visually indicating a drop in bolt tension. However, this arrangement does not include any means for determining actual bolt tension following installation. Moreover, in practice, it has been found that the amount of deflection of the strip is quite small, and it is consequently difficult to visually determine, upon subsequent inspection, that the strip has returned to its flattened position.

Bolts and nuts have also been proposed which incorporate an element which breaks or separates from the main body of the bolt or nut when the proper preload has been achieved. Reference is made, for example, to the Automatic Tension Control Bolts presently manufactured in Japan by a few firms, such as Sumikin Precision Forge Inc., and marketed by several American importers and distributors, and Guard-Nut offered by Guard-Nut of Sonoma, Calif. Again, however, these devices do not incorporate any means for monitoring bolt tension following installation. Some of these devices are also easily tampered with, and their use is not sanctioned in all jurisdictions.

Special bolts have also been proposed for preloading and, in some instances, providing some indication of bolt tension following installation. One example is Rota-Bolt offered by Peterson Industries, Inc., Carrollton, Tex. RotaBolt employs a rotatable wheel anchored to a rod member disposed in and anchored to the bottom of an axial bore in the bolt, the wheel is free to rotate until the bolt is tensioned to a specifically designed load. Apart from being expensive, the RotaBolt does not provide a mechanism for measuring the exact load on the bolt at any given time.

Another example is a bolt incorporating a dye-filled chambe. In response to a stress induced crack, the chamber seal is broken whereupon the dye escapes to the surface thereby providing a visual indication of the crack. Again, however, this bolt does not provide a mechanism for measuring actual bolt tension at any given time. An example of this type of bolt is described in the aforementioned Avoiding Failure In Bolted Joints, Assembly Engineering, April, 1984, p. 80.

Hydraulic stud tensioners are also employed to preload bolts. Basically, these arrangements hydraulically elongate the bolt to achieve the desired preload, whereupon a nut or other fastener is secured to the bolt for retaining the desired elongation. However, following installation, there is no simple way for monitoring the tension in such bolts. See, for example, the aforementioned Fastener Tension Control—What It's All About, Assembly Engineering, November, 1976, p. 30.

For extremely critical applications, bolts with built-in strain gage wires connected to monitoring stations may be employed. Such an arrangement allows monitoring of bolt length, and hence tension, both during and after installation. Such arrangements are, however, expensive and hence impractical for most applications. In some such arrangements pressure transducers attached to the bolts are wired to the monitoring stations. Alternatively, the transducers are fabricated in washer form. Apart from the expense of incorporating a washer at each joint, such transducers are temperature sensitive and typically have an upper limitation of 150 degrees Fahrenheit, which may be exceeded in some applications.

It is accordingly an object of the present invention to provide a relatively simple and inexpensive arrangement for periodically monitoring bolt tension following installation.

It is a further object of the present invention to provide such an arrangement for periodically monitoring bolt tension which further includes means for visually indicating proper preload of the bolt upon installation.

It is yet a further object of the present invention that the means for preloading the bolt upon installation and for periodically monitoring bolt tension following installation is incorporated in a washer, or alternatively, in a nut or bolt head.

It is a further object of the present invention to provide means to determine loading in standard bolts without the need to modify them, such as by drilling axial holes.

It is a further object of the present invention to provide a means to determine loading in bolts without the need to measure changes in distance or length.

DISCLOSURE OF THE INVENTION

In accordance with the present invention, I have developed an apparatus and method for measuring bolt tension in situ which overcomes many of the disadvantages of the prior art. In a preferred embodiment, a tab is disposed in a radial groove in the bearing surface of a washer such that when the washer is incorporated in a bolt assembly and the bolt is tightened, the distal end of the tab deflects. In accordance with the present invention, I have discovered that the force required to move the tab back to its undeflected position can be empirically correlated to the tension in the bolt. Consequently, by measuring the force required to return the tab to its undeflected position, actual bolt tension can be determined. In lieu of incorporating the tab in a washer, the tab may be incorporated in a nut or bolt head.

The foregoing as well as further features and advantages of the preferred apparatus and method in accordance with the present invention will be more fully apparent from the following detailed description and annexed drawings of the presently preferred embodiments thereof.

DETAILED DESCRIPTION OF THE PREFERRED EMBODIMENTS

Referring now to the drawings, and initially to FIGS. 1-4 thereof, a washer in accordance with the present invention is generally designated at 10. The washer 10, which incorporates a tab 12, is shown in combination with a high tension bolt 14 and a cooperating nut 16 which serve to join two structural elements, shown by way of illustration at two plates 18 and 20. The bolt 14 is of conventional design, shown by way of illustration as having a castellated hexagonal head 22 and a thread shank 24. The nut 16 is also of conventional design, shown by way of illustration as having a similar hexagonal castellated configuration, and is of approximately the same diameter as the bolt head 22. As is common, the washer 10 is of greater diameter than the diameter of the bolt head 22 whereby the washer extends beyond the bolt head when the bolt, nut and washer are assembled. In general, the hole 26 in the washer is of about the same diameter as the aligned holes 28 and 30 in the plates 18 and 20, respectively.

The above described components may be made from any suitable materials, though it will obvious to those of ordinary skill in the art that the major practical application is where the bolt, nut and washer are made of steel. Typically, the plates will also be of metal construction.

The underside of the bolt head 22 defines a bearing surface 32 which bears against the upper surface 34 of the washer 10 when the components are assembled.

Concentricity should be maintained beteen the shank 24 of the bolt 14 and the hole 26 of the washer 10 for insuring that the bearing surface 32 is evenly distributed over the washer surface 34. To this end, the defining wall 36 of the hole 26 in the washer 10 has a plurality of projecting nibs, shown by way of example as three equidistantly spaced nibs 38, which insure concentricity between the bolt shank 24 and the hole 26. To accommodate the fillet 40 at the juncture of the bearing surface 32 and the bolt shank 24, the nibs 38 are recessed relative to the upper surface 34 of the washer 10 (see FIG. 2).

The tab 12 comprises a strip of resilient material, such as metal, which serves essentially as a spring at rest in a flattened position. The tab 12 is disposed in a shallow groove 42 in the upper surface 34 of the washer 10 and is dimensioned such that the upper surface 44 of the tab 12 is flush with the upper surface 34 of the washer. The proximal portion 46 of the tab 12 nearest the washer hole 26 is secured in the groove 42 as by an adhesive. As preferred and shown, the distal portion 48 of the tab 12 ends at the periphery of the washer 10. For reasons that will be apparent hereinafter, a through hole 49 is provided in the distal portion 48 of the tab 12.

Figure 1:
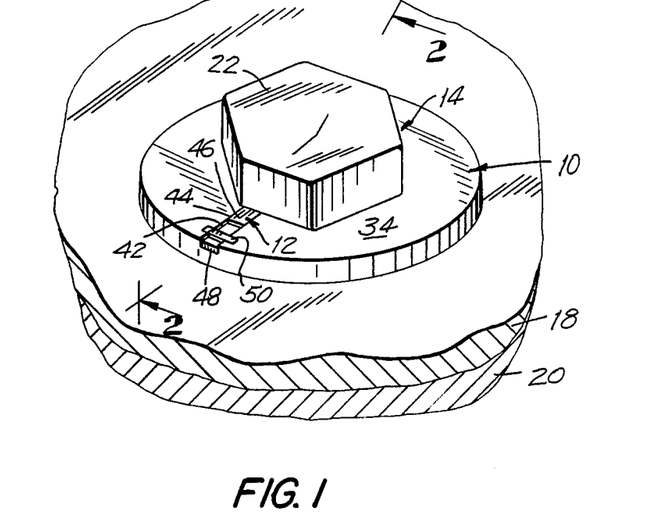
FIG. 1 is a perspective view of a washer in accordance with the present invention shown in assembled relation in a joint.
Figure 2:
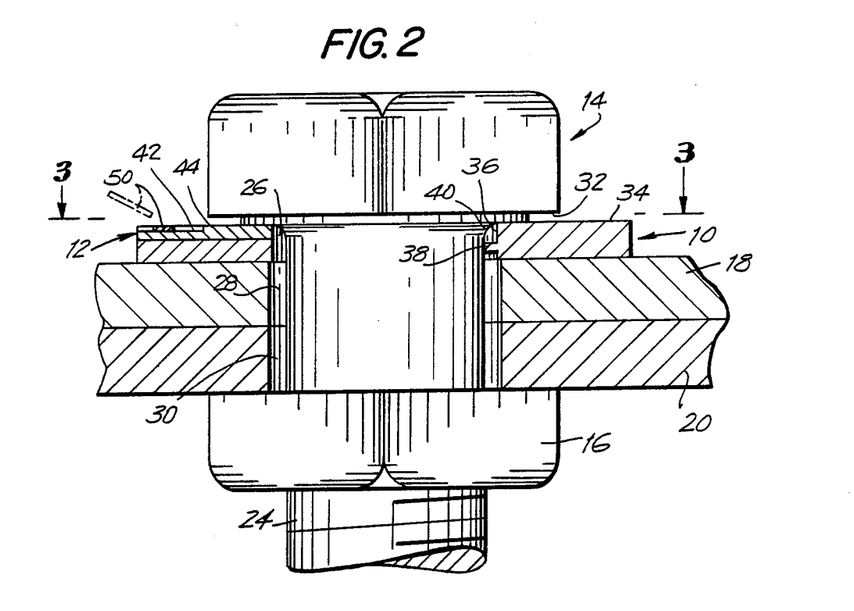
FIG. 2 is a sectional view taken substantially along the lines 2—2 in FIG. 1.
Figure 3:
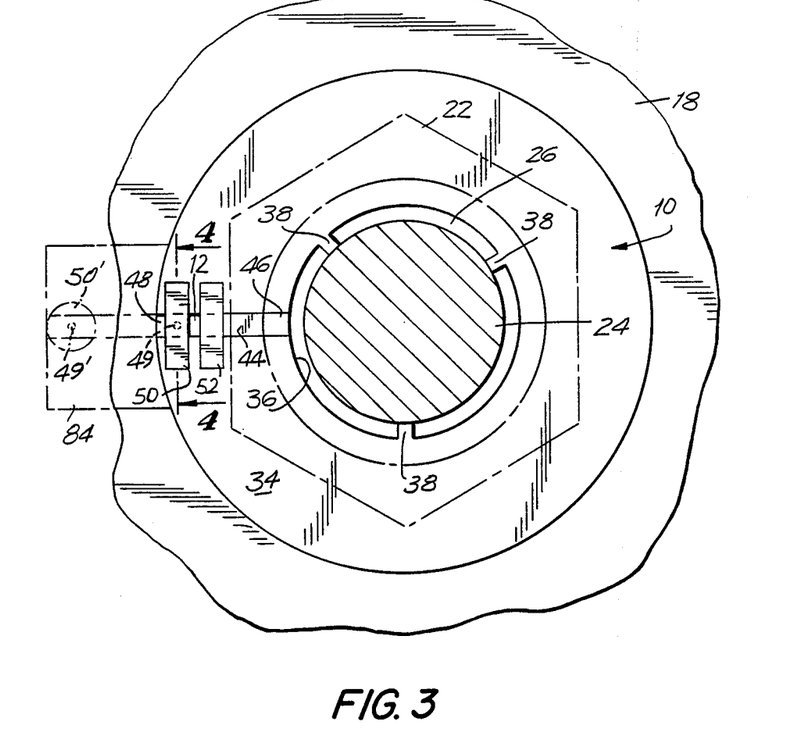
FIG. 3 is a sectional view taken substantially along the lines 3—3 in FIG. 2.
Figure 4:
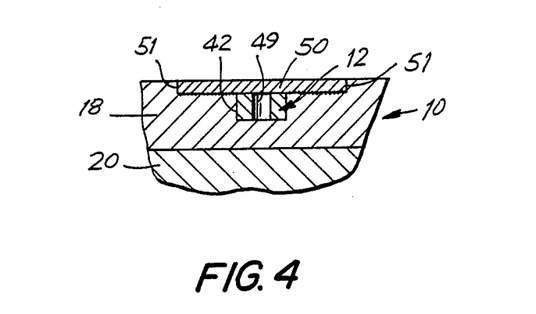
FIG. 4 is a fragmentary sectional view taken substantially along the lines 4—4 in FIG. 3.

A metal strip 50 is disposed across the top of the tab 12 at the distal portion 48 thereof. As shown, the ends of the strip 50 are secured, as by an adhesive, in a pair of recesses 51 in the upper surface 34 of the waser 10 on either side of the groove 42 such that the strip 50 is flush with or slightly recessed from the surface 34. The strip 50 is not adhesively secured to the tab 12. In the embodiment shown, the metal strip 50 overlies the hole 49. For reasons that will be apparent hereinafter, the strength of the adhesive joining the strip 50 to the washer 10 is preselected to fail at a specific stress level. Inasmuch as the proximal portion 46 of the tab 12 should be substantially flush with the surface 44 of the washer 10, as shown, the distal portion 48 of the tab 12 is of reduced thickness as compared with the proximal portion 46 for accommodating the strip 50. Additional metal strips may be disposed across distal portion 48 of tab 12 as shown in FIG. 3 by metal strip 52. Such additional metal strips may be secured to washer 10 as described above for metal strip 50, such that failure at a different predetermined stress level from that for metal strip 50 is accomplished.

With the foregoing description in mind, the utilization of the washer 10 for attaining a desired bolt tension upon installation and for monitoring bolt tension following installation will now be described. Referring to FIGS. 1-4, the bolt 14, nut 16 and washer 10 are assembled in the usual fashion for securing the plates 18 and 20 together. Owing to the nibs 38, the bearing surface 32 of the bolt 14 bears uniformly on the washer surface 34 and also bears on the upper surface 44 of the tab 12 at its proximal portion 46. As the bolt 14 is tightened, the washer 10 and the proximal portion 46 of the tab 12 are subjected to an increasing compressive force in direct correspondence to the increasing tension in the bolt 14. This compressive force acts to upwardly deflect the distal portion 48 of the tab 12 which, as a consequence, applies an upward force against the underside of the strip 50.

For a tab 12 of known construction and dimensions, the force applied by the distal portion 48 of the tab 12 against the strip 50 is dependent only on the compressive force applied to the tab 12 by the bolt 14 which, as noted, is related to bolt tension. Therefore, the force applied by the distal portion 48 of the tab 12 against the metal strip 50 may be empirically calibrated against bolt tension. Once this relationship is known, the adhesive bond between the metal strip 50 and the washer 10 may be preselected to fail at a force level corresponding to any desired bolt tension. In other words, if a particular bolt tension is desired, and it is known that that bolt tension causes the tab 12 to apply a known force against the strip 50, the adhesive bond between the metal strip 50 and the washer 10 can be preselected to fail at that force level. Consequently, when the desired bolt tension is reached and the adhesive bond between the metal strip 50 and washer 10 fails, the metal strip 50 pops off the washer (see FIG. 2) thereby providing a visual indication that the desired bolt tension has been achieved. It will now be apparent that by recessing the tab 12 and strip 50 in the surface 44 of the washer 10, the washer is rendered relatively tamper-proof prior to installation and use.

Thus far, only the use of the washer 10 to achieve accurate preloading of the bolt 14 upon installation has been described. However, and as noted above, in many applications it is essential to periodically confirm that proper bolt tension is being maintained. In accordance with the present invention, it has been found that the force required to move the tab 12 back to its flattened position in the groove 42 is directly related to the tension in the bolt 14. For a tab 12 of given construction and dimensions, this relationship can be empirically determined. Once the relationship is known, the tension in the bolt 14 can be determined by simply measuring the force required to move the tab 12 back to its flattened position.

Figure 5:
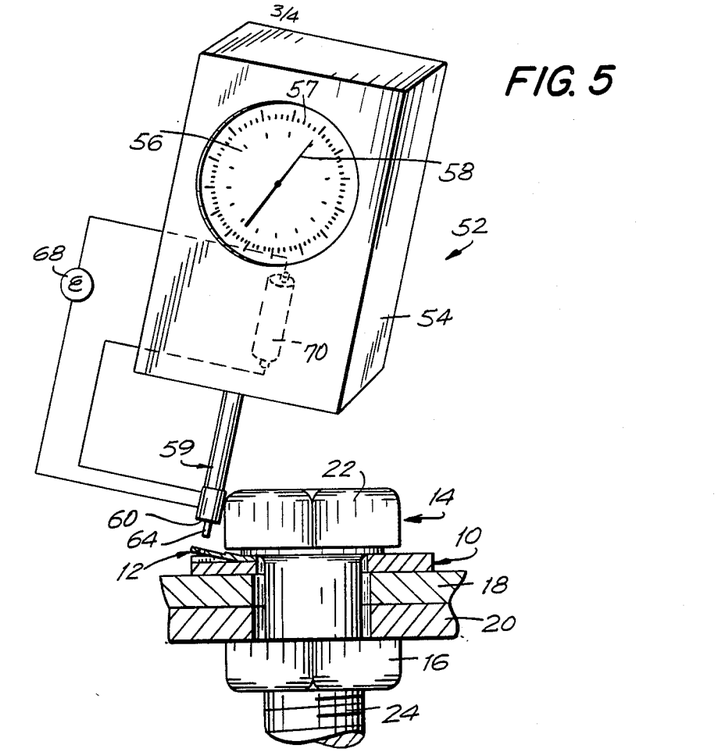
FIG. 5 is a view similar to FIG. 2, and also showing, in partly diagrammatic form, a modified force gauge in accordance with the present invention.
Figure 6:
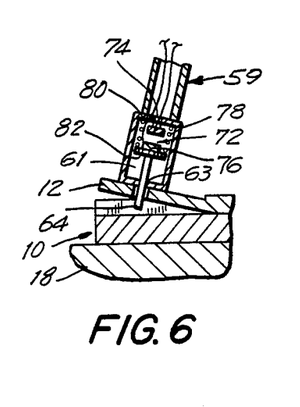
FIG. 6 is a fragmentary view, partly in section, showing a portion of the force gauge and its cooperation with the washer.
Figure 7:
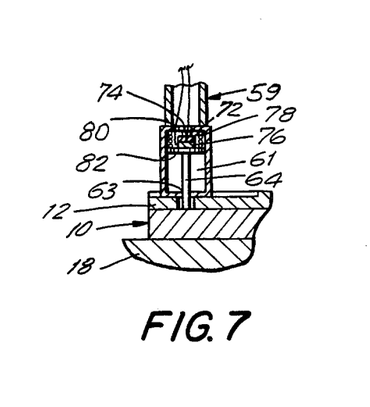
FIG. 7 is a view similar to FIG. 6, but showing the force gauge and washer in a second position.

Referring to FIGS. 5–7, a preferred apparatus for measuring the force required to move the tab 12 back to its flattened position in the groove 42 is shown. Basically, the apparatus comprises a modified force gauge of the compression or "push" type. Compression type force gauges for applying a force to an object and for measuring the applied force are well known. For example, such force gauges are sold by Wagner Instruments, Greenwich, Conn. and shown, for example, in their 1986 catalog 103. There are two basic types, mechanical, employing a spring type mechanism, and electronic, employing a transducer and associated circuitry.

Referring specifically to FIG. 5, a force gauge is generally designated at 52 and includes a housing 54, scales 56 and 57, and a needle pointer 58. A stud 59 protruding from the lower end of the housing 54 is connected to a force transducer (not shown) which measures the force applied to the bottom wall 60 of the stud 59. The transducer provides a signal to the needle 58 which indicates the applied force on the scale 56. As thus far described, the force gauge is conventional. In accordance with the invention the gauge 52 is modified in two principal respects. First, the scale 56 differs from the scale in a conventional force gauge in that it shows both the applied force and the corresponding bolt tension. Second, and as will now be described, the gauge 52 incorporates a mechanism for determining the precise point at which the tab 12 is returned to its flattened position in the groove 42.

Referring now to FIGS. 5-7, a hollow chamber 61 is defined in the lower end of the stud 59. The bottom wall 60 of the stud 59, which also comprises the bottom defining wall bf the chamber 61, has a centered aperture 63. A pin 64 in the chamber 61 protrudes through the aperture 63, there being sufficient clearance between the pin 64 and the aperture 63 for the pin to slide freely in the aperture. As shown, a coil spring 78 disposed between the upper defining wall 80 of the chamber 61 and a radial shoulder 82 on the pin 64 biases the pin to a position wherein the pin extends out of the chamber 61. As shown, the shoulder 82 on the pin 64 is larger than the aperture 63 whereby the shoulder 82 also serves to prevent the pin 64 from sliding completely out of the chamber 61. For reasons explained below, the pin 64 is dimensioned to fit in the hole 49 in the tab 12.

The gauge 52 also includes a circuit comprising a visual indicator, such as a lamp 68, a battery 70 and a switch 72, with the lamp lighting when the switch 72 is closed. The switch is defined by a first stationary contact 74 in the chamber 61 and a second movable contact 76 secured to the upper end of the pin 64. In addition to lighting the lamp 68, closing the switch 72 also serves to "freeze" the needle 58. Suitable circuitry for freezing the needle 58 upon closing of the switch 72 is well known to the person of ordinary skill in the art and accordingly a detailed description thereof is not deemed necessary.

Assume now that the bolt 14, nut 16 and washer 10 assembly have been in place for sometime, and it is desired to measure the tension in the bolt 14 to insure that the proper tension is being maintained. Provided the bolt 14 is still applying a compressive force on the upper surface 44 of the tab 12, the distal portion 48 of the tab 12 will be in the upwardly deflected position illustrated in FIGS. 5 and 6. To measure bolt tension, the gauge 52 is brought into proximity to the bolt 14 and the pin 64 is inserted into the hole 49 in the tab 12 until the bottom wall 60 of the gauge 52 abut the upper surface 44 of the tab 12. Now, as the user pushes the gauge 52 towards the tab 12, the force applied by the user is transmitted to the tab via the abutting surfaces 60 and 44 thereby urging the tab towards its flattened position. Simultaneously, the force applied against the stud 59 is indicated by the needle 58. As the tab 12 moves to its flattened position, the bottom of the pin 64 contacts the bottom defining wall of the groove 42. Accordingly, continued movement of the tab 12 to its flattened position also results in movement of the pin 64 towards the contact 74 against the bias of spring 78. Inasmuch as it is only desired to measure the force applied to the stud 59 by the tab 12, any force applied to the stud 59 by the pin 64 compressing the spring 78 may be nulled out by techniques well known to those of ordinary skill in the art.

The length of the portion of the pin 64 extending beyond the wall 60 when the contacts 74 and 76 are closed is exactly equal to the thickness of the tab 12. Accordingly, the contacts 74 and 76 will close at the precise moment that the tab 12 has moved to its fully flattened position, i.e. at the precise moment when there is no longer any space between the bottom of the tab 12 and the bottom defining wall of the groove 42. As noted above, when the contacts 74 and 76 close, the lamp 68 lights and the position of the needle 58 is frozen. At this point, the bolt tension indicated by the needle 58 on the scale 56 is the actual tension in the bolt 14. Any necessary adjustment of the bolt tension can then be made using conventional techniques.

Of course, the empirically determined relationship between bolt tension and the force applied to the stud 59 by the tab 12 as displayed on the scale 56 is correct only for a tab 12 of known construction and dimensions. If the gauge 52 is to be used with tabs of varying construction or dimensions, multiple scales may be incorporated in the gauge 52 relating applied force to bolt tension for each different type of tab. Of course, the applied force need not be displayed at all. As a further possibility, such multiple scales may be incorporated in a memory device in the gauge with the appropriate scale for a particular tab type being selected by a switch on the housing 54, in which event it may be desirable to substitute an LED display for the needle 58 and scale 56. Of course, an LED display could also be substituted in the embodiment shown in FIG. 5.

Alternative arrangements for measuring the force applied to the tab 12 by the force gauge 52 at the point when the tab 12 is returned to its fully flattened position will suggest themselves to those of ordinary skill in the art once this description is known. One such alternative is to modify the washer 10 such that the upper surface 44 of the tab 12 is flush with the upper surface of the washer when the tab 12 is returned to its fully flattened position in the groove 42 and to utilize the upper surface 34 of the washer as a reference point. For example, in one such arrangement the bottom wall 60 of the force gauge 52 is enlarged such that when the pin 64 is in the hole 49, a portion of the bottom wall 60 extends beyond the tab 12. A pressure sensitive transducer is incorporated in the gauge 52 with its contact face flush with the bottom surface of the wall 60 in the portion thereof extending beyond the tab 12. Consequently, the contact face of the transducer will contact the washer surface 34 at the point when the tab 12 is returned to its fully flattened position. At the moment the transducer senses such contact it provides a signal to the circuit driving the needle 58 for locking the needle at its then position. As before, the bolt tension indicated by the needle 58 is the actual bolt tension in the bolt 14. When this arrangement is employed, it will be apparent that the pin 64 need not be slidable in the chamber 61, and that the pin 64 could be eliminated altogether and replaced by some other suitable arrangement for mating gauge 52 to tab 12 during the measurement procedure.

Figures 8, 9, 10, 11:
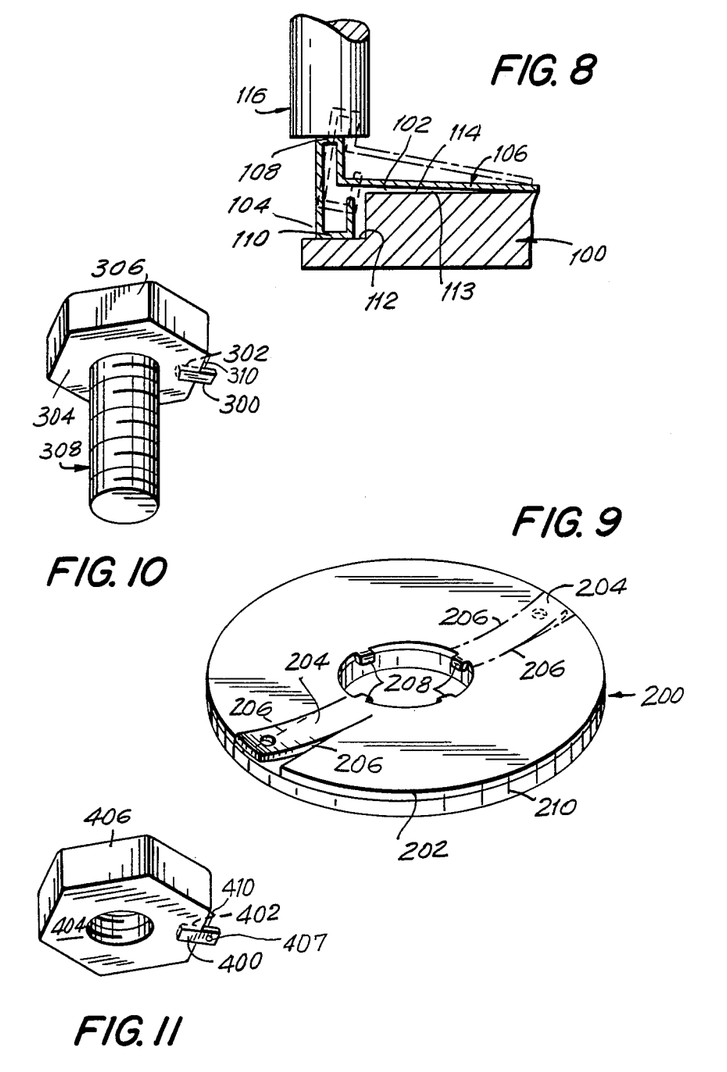
FIG. 8 is another fragmentary view similar to FIG. 6, but showing a modified form of washer in accordance with the present invention.
FIG. 9 is a perspective view illustrating a still further modified form of a washer in accordance with the present invention.
FIG. 10 is a perspective view of a bolt incorporating the present invention.
FIG. 11 is a perspective view of a nut incorporating the present invention.

An alternative arrangement for detecting the point at which the tab is returned to its flattened position is illustrated in FIG. 8. In FIG. 8, the tab 106 seats in a groove 102 in the upper surface of the washer 100. As shown, the groove 102 is similar to the groove 42 in FIGS. 1–7, except that the groove 102 includes a further recessed portion 104 at the periphery of the washer. The tab 106 comprises an extruded resilient metal member of hammer-shaped cross section. As with the embodiment of FIGS. 1–7, the end of the tab 106 nearest the center of the washer 100 is secured to the washer as by an adhesive. The distal portion of the tab 106 defines upper and lower bearing surfaces 108 and 110, respectively. For reasons that will be explained below, when the lower contact surface 110 contacts the bottom defining wall 112 of the recessed portion 104 of the groove 102, a slight gap 113 remains between the bottom defining wall 114 of the non-recessed portion of the groove 102 and the portion of the tab 106 thereabove.

The embodiment illustrated in FIG. 8 is intended for use with a conventional compression type force gauge modified only to the extent that its scale reflects bolt tension. When it is desired to measure the tension on a bolt (not shown) utilized with the washer 100, the tab 106 will be in an upwardly deflected position as illustrated by the phantom lines in FIG. 8. The force gauge 116 is applied to the upper contact surface 108 of the tab 106 whereupon the user pushes down on the force gauge until the tab 106 is returned to its fully flattened position. The flattened position of the tab 106 is tactily detected by the user as the lower contact surface 110 strikes the surface 112. Owing to the gap 113, the only portion of the tab 106 bottoming in the groove is the contact surface 110, and it has been found that this arrangement provides a more positive "feel" to the user, as contrasted with an arrangement wherein the entire length of the tab bottoms in the groove when the tab is flattened. As before, the bolt tension indicated by the needle 58 when the tab 106 strikes the surface 112 is the actual bolt tension at the time of the measurement. While this arrangement may not be as accurate as that illustrated in FIGS. 1-7, it does provide the advantage of requiring a less sophisticated force gauge. If desired, the lower end of the force gauge 116 and the contact surface 108 may be configured to securely mate for retaining the gauge 116 against the surface 108 as the tab is moved to its flattened position.

Figure 12:
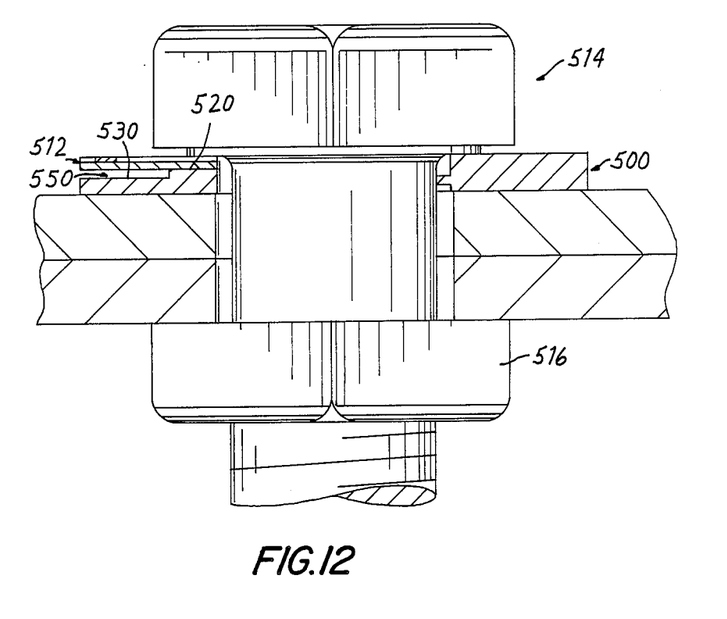
FIG. 12 is a sectional view similar to FIG. 2, but showing an alternate embodiment of a washer in accordance with the invention.

It will also be apparent to those of ordinary skill in the art that while a special embodiment of a washer 10 is illustrated in FIGS. 1-7, various modifications may be made therein without departing from the spirit and scope of the invention. For example, the washer illustrated in FIGS. 1-7 may be constructed with a gap between the bottom of the tab 12 and the bottom defining wall of the groove 42 when the tab is in its fully flattened position. This is shown by way of Example in FIG. 12, wherein a washer 500 incorporating a tab 512 is in combination with a high tension bolt 514 and a cooperating nut 516, the tab 512 being disposed in a groove 542 in the washer 500. As shown, the tab 512 contacts washer 500 along interface 520 but is separated from the inner face 530 of washer 500 by a gap 550. This may be desirable in applications where the washer 10 is exposed to the elements for an extended period of time, which could result in debris accumulating in the groove. The provision of a gap beneath the tab would preclude such debris from interfering with movement of the tab 12 to its fully flattened position when bolt tension is checked. Of course, in such an arrangement bottoming of the tab in the groove could not be used as an indication that the tab is in its flattened position. However, the flattened position of the tab could still be determined, for example, by registry between the upper surface of the tab and the upper surface of the washer.

FIG. 9 illustrates a further alternative embodiment of a washer 200 usable in accordance with the present invention. As shown, the washer 200 comprises a thin washer 202 having one or more tabs 204. Each tab 204, rather than comprising a separate element as in the earlier embodiments described herein, comprises a portion of the washer 200 defined by two radial slits 206 on either side of each tab 204. The thin washer 200 is further provided with a plurality of nibs 208 corresponding to the nibs 38 in FIG. 2, the nibs 208 being integral with the washer 200 and having a slight downward bend for clearing the fillet of the bolt head. One advantage of this arrangement is that it eliminates the need to cut a special groove for the tabs 204 as required in the earlier embodiments described herein. Especially where multiple tabs 204 are used, this may result in a significant cost saving. As shown, the thin washer 202 is permanently attached to a standard washer 210 as by spot welding or an adhesive. This is necessary inasmuch as tests have shown that during the torquing operation a thin washer alone will tear apart at the junction of the tab 204 with the body of the washer. The washer 200 may be used, for example, in an arrangement wherein return of the tab 204 to its flattened position is determined by registry between the upper surface of the tab and the upper surface of the washer.

If desired, and as indicated by the phantom lines in the left-hand portion of FIG. 3, the washer 10 may be provided with an extension 84 such that both the groove 42 and the tab 12 extend beyond the periphery of the main body of the washer. In this way, when it is desired to measure bolt tension, the user has additional working room clear of the bolt head 22. The indicator 50', which is shown, for point of illustration only, to be of circular shape, functions in the same manner as the metal strips 50 and 51 for providing visual indicators at multiple preload levels.

In a further modification of this embodiment, a commercially available miniature force transducer, such as the ALD-Micro-Load Cell manufactured by A.L. Design, Inc., Amherst, N.Y., is secured on the extension 84 facing downward against the tab 12. In this embodiment, as the bolt 14 is tightened, the distal portion 48 of the tab 12 applies an upward force against the transducer. By correlating this force to bolt tension in the manner described above, the transducer output will provide a continuous indication of actual bolt tension. This information could be used both to properly tension the bolt upon installation and also to monitor bolt tension in situ following installation. Presently, this alternative is not preferred, as the cost of suitable transducers is rather high, though with a reduction in the cost of such transducers this embodiment could have significant practical application.

As a still further alternative, the strip or indicator 50 may be eliminated altogether and proper bolt tension upon installation could be determined instead by sensing the force required to retain the tab 12 in its flattened position. For example, an electric wrench or other suitable tool may be employed in conjunction with a compression type force gauge applied to the tab 12 and pressed down so as to hold the tab 12 in its flattened position. As the bolt is tightened, and as explained above, compression of the proximal portion 46 of the tab 12 by the bolt head 22 applies an upward force at the distal portion 48 of the tab. This upward force, which directly corresponds to bolt tension, is continuously monitored by the force gauge and correlated to actual bolt tension. When the desired bolt tension is reached, the force gauge provides a signal for turning off the wrench. Technology for deactivating a wrench in response to a signal indicating a desired level of tightening is well known.

Figure 13:
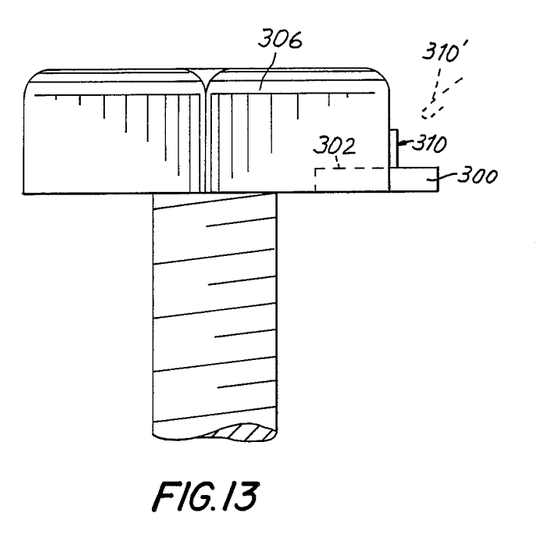
FIG. 13 is a sectional view of a modified bolt of the present invention.

Also, while it is preferable to incorporate the deflecting tab into a washer in accordance with the embodiments described above, the deflecting tabs could, instead, be incorporated into a bolt head or nut. These alternatives are illustrated in FIGS. 10 and 11, respectively. In FIG. 10, a tab 300 is secured in a recess 302 in the bearing surface 304 of a bolt head 306. In this embodiment, as the bolt 308 is tightened, the distal portion of the tab 300 deflects. As in the other embodiments described hereinabove, the force required to return the tab 300 to its nondeflected position can be correlated to bolt tension for monitoring actual bolt tension following installation. As shown in FIG. 13, a strip 310 may be adhered to the radial surface of bolt head 306. Strip 310 rests on tab 300 such that when tab 300 is deflected upon the tightening of bolt head 306, at a predetermined stress level, strip 310 is freed from bolt head 306 as shown in phantom at 310'. In addition, bolt head 306 may be constructed with a gap between the bottom of tab 300 and the defining wall of recess 302 when tab 300 is in its fully flattened position. The construction of a bolt head having such a gap may be analogous to that shown for the washer embodiment of FIG. 12. Once this description is known, it will be apparent to those of ordinary skill in the art that other features of the present invention as described hereinabove may also be employed in connection with the embodiment of FIG. 10.

FIG. 11 shows a tab 400 secured in a recess 402 in the bearing surface 404 of a nut 406. Tab 400 has a hole 407 which provides means for engaging a force gauge for measuring bolt tension, e.g., force gauge 52 shown in FIG. 5. The tab 400 functions in substantially the same fashion as the tab 300 described above in connection with FIG. 10, and accordingly a further description thereof is not deemed necessary. Among the modifications, for example, that may also be employed in connection with the embodiments of FIGS. 10 and 11, is the inclusion of a miniature force transducer, such as the ALD-Micro-Load Cell transducer discussed above. The transducer would be secured to either the nut or bolthead, with its sensing end positioned against the tab. In this modification, as the bolt is tightened, the distal portion of the tab applies an upward force against the transducer such that the transducer provides a continuous indication of actual bolt tension. Such a transducer is shown diagramatically at 310 in FIG. 10 and 410 in FIG. 11.

Since these as well as additional changes and modifications are intended to be within the scope of the present invention, the foregoing description should be considered as illustrative and not in a limiting sense, the scope of the invention being defined by the following claims.

I claim:

1. A system for measuring bolt tension in situ comprising:
   a washer having a bearing surface;
   a tab having a proximal portion joined to said washer for bearing with said bearing surface thereof, and a distal portion movable from an undeflected position to a deflected position when said proximal portion of said tab is stressed upon tensioning of said bolt;
   means engageable with said distal portion of said tab for determining the force required for moving said distal portion from said deflected position to said undeflected position; and
   wherein said tab incorporates means for engaging said force determining means.

2. The system according to calim 1, wherein said washer has a radial groove in said bearing surface, and wherein said tab is disposed in said groove.

3. The system according to claim 2, wherein the exposed surface of said proximal portion is substantially flush with said bearing surface of said washer.

4. The system according to claim 3, further comprising a strip contacting said tab; and means for securing said strip to said washer for failure of the securing means at a predetermined stress level.

5. The system according to claim 4, wherein said washer has a recess in said one surface and wherein said strip is disposed in said recess.

6. The system according to claim 4, further comprising at least one additional strip disposed across said distal portion of said tab; and means for securing said additional strip to said washer for failure at a different predetermined stress level.

7. The system according to claim 2, wherein a space is defined between said tab and the bottom defining wall of said groove when said tab is in said undeflected position.

8. The system according to claim 1, wherein said engaging means comprises the tab having a hole for receiving a projection on said force determining means.

9. The system according to claim 1, wherein said engaging means comprises an isolated surface portion for engaging a surface of said force determining means.

10. The system according to claim 1, wherein said washer has a pair of radial slits extending from the periphery of said washer to the inner portion thereof; and wherein said tab comprises the portion of said washer between said radial slits.

11. The system according to claim 10, wherein said washer is comparatively thin and further comprising a standard washer secured to said thin washer.

12. The system according to claim 1, wherein said washer further comprises means for centering said washer about said bolt.

13. The system according to claim 1, wherein said force determining means comprises a force gauge.

14. The system according to claim 13, wherein said force gauge further comprises means correlating said force to bolt tension.

15. The system according to claim 1, wherein said force determining means comprises a transducer secured to said washer and abutting said tab.

16. A system for measuring bolt tension in situ comprising:
    a nut or bolt head having a bearing surface;
    a tab having a proximal portion joined to said nut or bolt head for bearing with said bearing surface thereof, and a distal portion movable form an undeflected position to a deflected position when said tab is stressed upon tensioning of said bolt;
    means engageable with said distal portion of said tab for determining the force required for moving said distal portion from said deflected position to said undeflected position; and
    wherein said tab incorporates means for engaging said force determining means.

17. The system according to claim 16, wherein said nut or bolt head has a radial groove in said bearing surface, and wherein said tab is disposed in said groove.

18. The system according to claim 17, wherein the exposed surface of said proximal portion of said tab is substantially flush with said bearing surface.

19. The system according to claim 18, further comprising a strip contacting said tab; and means for securing said strip to said nut or bolt head for failure of the securing means at a predetermined stress level.

20. The system according to claim 17, wherein a space is defined between said tab and the bottom defining wall of said groove when said tab is in said undeflected position.

21. The system according to claim 16, wherein said engaging means comprises the tab having a hole for receiving a projection on said force determining means.

22. The system according to claim 16, wherein said engaging means coprises an isolated surface portion for engaging a surface of said force determining means.

23. The system according to claim 16, wherein said force determining means comprises a force gauge.

24. The system according to claim 23, wherein said force gauge further comprises means correlating said force to bolt tension.

25. The system according to claim 16, wherein said force determining means comprises a force sensing transducer secured to said nut or bolt head and abutting said tab.

26. A device usable with a force measuring apparatus for measuring bolt tension in situ, said device comprising:
 a washer having a bearing surface;
 a tab having a proximal portion joined to said washer for bearing with said bearing surface thereof, and a distal portion movable from an undeflected position to a deflected position when said tab is stressed upon tensioning of said bolt, said tab including means for engaging said force measuring apparatus for measurement of the force required to move said distal portion of said tab from said deflected position to said undeflected position by engagement of said force measuring apparatus with said engaging means on said tab.

27. The device according to claim 26, wherein said washer has a radial groove in said bearing surface and wherein said tab is disposed in said groove.

28. The device according to claim 27, wherein the exposed surface of said proximal portion of said tab is substantially flush with said bearing surface of said washer.

29. The device according to claim 28, further comprising a strip contacting said tab; and means for securing said strip to said washer for failure of the securing means at a predetermined stress level.

30. The device according to claim 29, wherein said washer has a recess in said bearing surface and wehrein said strip is disposed in said recess.

31. The device according to claim 27, wherein a space is defined between said tab and the bottom defining wall of said groove when said tab is in said undeflected position.

32. The device according to claim 26, wherein said engaging means comprises the tab having a hole for receiving a projection on said force measuring apparatus.

33. The device according to claim 26, wherein said engaging means comprises an isolated surface portion on said tab for engaging a surface of said force measuring apparatus.

34. The device according to claim 26, wherein said washer has a pair of radial slits extending from the periphery of said washer to the inner portion thereof; and wherein said tab comprises the portion of said washer between said radial slits.

35. The device according to claim 34, wherein said washer is comparatively thin and further comprising a standard washer secured to said thin washer.

36. The device according to claim 26, wherein said washer further comprises means for centering said washer about said bolt.

37. A device usable with a force measuring apparatus for measuring bolt tension in situ, said device comprising:
 a nut or bolt head having a bearing surface;
 a tab having a proximal portion joined to said nut or bolt head for bearing with said bearing surface thereof, and a distal portion movable from an undeflected position to a deflected position when said tab is stressed upon tensioning of said bolt, said tab including means for engaging said force measuring apparatus for accommodating measurement with said force measuring apparatus of the force required to move said distal portion of said tab from said deflected position to said undeflected position.

38. The device according to claim 37, wherein said nut or bolt head has a radial groove in said bearing surface and wherein said tab is disposed in said groove.

39. The device according to claim 38, wherein the exposed surface of said proximal portion of said tab is substantially flush with said bearing surface of said nut or bolt head.

40. The device according to claim 34, further comprising a strip contacting said tab; and means for securing said strip to said nut or bolt for failure of the securing means at a predetermined stress level.

41. The device according to claim 38, wherein a space is defined between said tab and the bottom defining wall of said groove when said tab is in said undeflected position.

42. The device according to claim 37, wherein said engaging means comprises the tab having a hole for receiving a projection on said force measuring apparatus.

43. The device according to claim 37, wherein said engaging means comprises an isolated surface portion on said tab for engaging a surface of said force measuring apparatus.

44. A method for in situ measurement of bolt tension in a bolt assembly comprising:
 providing a tab having a proximal portion joined to a bolt, nut or washer in said bolt assembly for bearing with a bearing surface of said nut, bolt or washer, respectively, and a distal portion movable from an undeflected position to a deflected position when said tab is stressed upon tensioning of said bolt; and
 measuring the force required to move said distal portion of said tab from said deflected position to said undeflected position by application of a force measuring apparatus to said tab.

45. The method according to claim 44, further comprising correlating said required force with bolt tension.

46. The method according to claim 45, wherein said force measuring step comprises pushing on said tab with a force gauge until said tab is moved from said deflected position to said undeflected position.

* * * * *